United States Patent

Inagaki

[15] 3,706,922

[45] Dec. 19, 1972

[54] LINEAR COMB-SHAPED SYNCHRONOUS MOTOR

[72] Inventor: Junpei Inagaki, Yokohama, Japan

[73] Assignee: Tokyo Shibaura Electric Company, Limited, Kanagawa-ken, Japan

[22] Filed: June 8, 1971

[21] Appl. No.: 151,077

[30] Foreign Application Priority Data

June 11, 1970 Japan ..................................45/49986

[52] U.S. Cl. ......................................318/135, 310/12
[51] Int. Cl. ................................................H02k 41/02
[58] Field of Search ....................318/121, 135, 68 N; 310/12–14; 104/148 LM

[56] References Cited

UNITED STATES PATENTS

| | | | |
|---|---|---|---|
| 3,456,136 | 7/1969 | Pierro | 310/12 |
| 3,225,228 | 12/1965 | Roshala | 310/12 |
| 3,577,929 | 5/1971 | Onoda et al. | 104/148 LM |
| 3,594,622 | 7/1971 | Inagaki | 310/13 |

FOREIGN PATENTS OR APPLICATIONS 1,143,801  2/1969  Great Britain..........................310/13

*Primary Examiner*—D. F. Duggan
*Attorney*—Oblon, Fisher & Spivak

[57] ABSTRACT

A linear comb-shaped synchronous motor includes a tubular-shaped reaction rail, an excitation conductor extending through said tubular shaped reaction rail, and a moving member containing an armature. The tubular shaped reaction rail has at least one zigzag slit along the longitudinal direction thereof and each side of the reaction rail is provided with comb-shaped pole members. As current flows through the excitation conductor, the comb-shaped pole members are magnetized such that the comb-shaped pole members aligned along one side of the zigzag slit make a trail of south poles and the comb-shaped pole members aligned along the other side of the zigzag slit make a train of north poles. The moving member is placed near the reaction rail through an air gap between the armature and the pole members, and the same is driven along the reaction rail.

9 Claims, 10 Drawing Figures

INVENTOR
JUNPEI INAGAKI

BY Oblon, Fisher & Spivak
ATTORNEYS

LINEAR COMB-SHAPED SYNCHRONOUS MOTOR

BACKGROUND OF THE INVENTION

1. Field of the Invention

The present invention generally relates to a linear synchronous motor and more particularly to a linear synchronous motor having a tubular-shaped reaction rail with comb-shaped pole members.

2. Description of the Prior Art

Two types of linear motors are known in the prior art. One is of the linear induction type and the other is of the linear synchronous type. As is also well known in the art, the linear induction motor has undesirable starting characteristics. With the linear induction motor it has also been difficult to provide a large gap length between the reaction rail and the armature thereof in order to prevent a decrease in the efficiency of the motor. Thus, when the linear induction motor has been employed as a drive for electric car equipment, problems, such as rolling, have often resulted from the prescribed smaller gap length between the reaction rail and the armature thereof when the car passes through curved tracks.

On the other hand, while somewhat satisfactory, prior art linear synchronous motors have had problems in that either the excitation windings therefore had to be wound along the rail or permanent magnets had to be buried along the rail in order to provide the magnetic poles with alternately different polarities, as the poles were successively disposed along the lengthwise direction of the reaction rail. The arrangement where the excitation winding was placed along the rail was found to be relatively expensive and the arrangement where the permanent magnets were placed along the rail resulted in a complicated procedure for manufacturing the reaction rail. However, it should be noted that the latter arrangement enabled a higher performance to be realized than the former, even though the gap length had to be selected to have a larger amplitude than in the former case.

SUMMARY OF THE INVENTION

Accordingly, it is an object of the present invention to provide a new and improved unique linear synchronous motor.

It is another object of the present invention to provide a new and improved linear synchronous motor in which a unique reaction rail is employed.

It is one other object of the present invention to provide a new and improved unique linear synchronous motor which can easily sustain a moving member.

One further object of the present invention is to provide a new and improved linear synchronous motor in which the air resistance of a moving member thereof is greatly decreased.

Yet one further object of the present invention is to provide a new and improved linear synchronous motor wherein a low power consumption conductor can be used.

Yet still one further object of the present invention is to provide a new and improved linear synchronous motor which is relatively inexpensive and easy to construct.

Briefly, in accordance with the present invention, these and other objects are in one aspect obtained by providing an elongated reaction rail having a tubular cross section and made of a magnetic material. The reaction rail is provided with at least one zigzag slit along the longitudinal direction thereof. First comb-shaped electromagnetic pole members are provided at one edge portion of the rail and adjacent to the zigzag slit of the rail. Second comb-shaped electromagnetic pole members are provided at the other edge portion of the rail and adjacent to the zigzag slit of the rail. Each of the second comb-shaped electromagnetic pole members are respectively disposed without direct contact between adjacent electromagnetic pole members of the first comb-shaped electromagnetic pole members. At least one electric conductor extends through the tubular type reaction rail and is supplied a D.C. excitation current such that one group of the first or second comb-shaped electromagnetic pole members is magnetized so as to make a train of north poles and the other group is magnetized so as to make a train of south poles. At least one armature structure is provided. The armature structure has a polyphase winding wound thereon which is supplied an A.C. excitation. The armature structure is mounted on a moving member and is successively faced to the functional surface of some of said first and second comb-shaped electromagnetic pole members through an air gap as the moving member moves along the reaction rail.

BRIEF DESCRIPTION OF THE DRAWINGS

A more complete appreciation of the invention will be readily appreciated as the same becomes better understood by reference to the following detailed description when considered in connection with the drawings wherein.

DETAILED DESCRIPTION OF THE PREFERRED EMBODIMENTS

Figure 1:
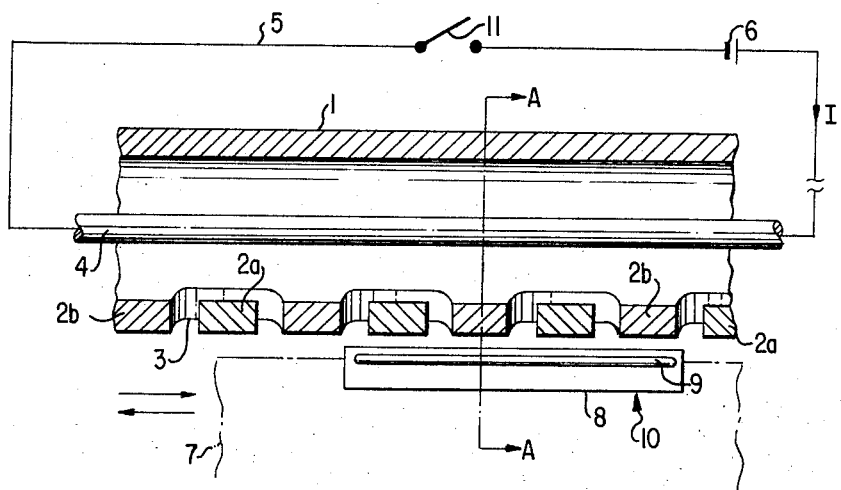
FIG. 1 is a longitudinal cross section view of a linear comb-shaped synchronous motor according to this invention.
Figure 2:
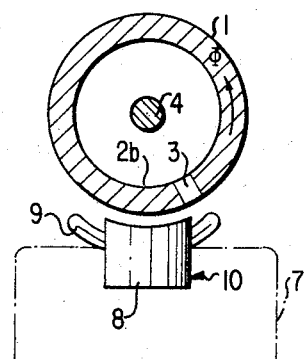
FIG. 2 is a sectional view taken along the line A—A of FIG. 1.
Figure 3:
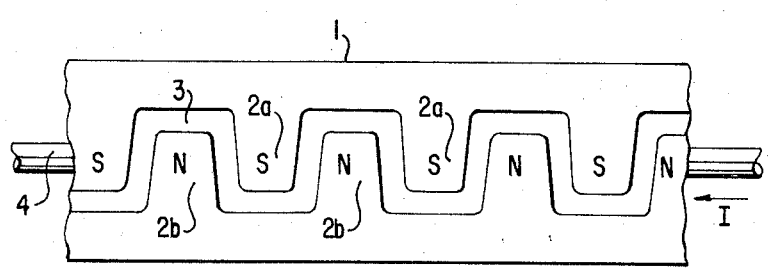
FIG. 3 is a plane view of a reaction rail according to this invention.

Referring now to the drawings wherein like reference numerals designate identical, or corresponding parts throughout the several views, and more particularly to FIGS. 1 through 3 thereof wherein the linear synchronous motor of the present invention is shown as including a reaction rail 1 having a tubular cross section and as being made of a magnetic material. The reaction rail 1 is provided with at least one zigzag slit 3 along the longitudinal direction thereof. First and second comb-shaped electromagnetic pole members 2a and 2b are provided at both edge portions of the reaction rail 1 and are positioned adjacent to the zigzag slit 3. Each of the first comb-shaped electromagnetic pole members are respectively disposed between the adjacent electromagnetic pole members of the second comb-shaped electromagnetic pole members. The zigzag slit 3 may be plugged or sealed with a non-magnetic material.

An excitation conductor 4 is provided and extends throughout the reaction rail 1 for enabling excitation thereof. The conductor 4 is connected to a D.C. voltage supply 6 through a conductor 5 and a switch 11.

A moving member 7, which is movable along the reaction rail 1, is provided and the same is positioned near the pole members 2a and 2b. An armature 10 is mounted on the moving member 7 and is positioned with a suitable space so as to face the pole members 2 of the reaction rail 1. The armature 10 includes an armature core 8 and an armature winding 9 wound thereon.

The operation of the linear synchronous motor described above is as follows. At first the switch 11 is turned on and a D.C. current will flow through the excitation conductor 4 in a direction as shown by the arrow in FIG. 1. A magnetic flux will thereby be induced in the reaction rail 1 and will flow in a direction as shown by the arrow in FIG. 2. Under such conditions, the pole members 2a will be magnetized so as to make a train of south poles, and the pole members 2b will be magnetized so as to make a train of north poles. It should be understood that the reaction rail 1 is formed such that the north and south poles will alternate.

The operation during excitation of the armature 10 can be understood as follows. When the armature 10 is, for example, excited as a south pole, and the position of it is above a south pole member 2a, then the armature 10 and the south pole member 2a will repulse each other. At the same time, however, the armature 10 will be drawn toward the adjacent or next north pole member 2b. During such time the moving member 7 will move from the south pole member 2a to the next north pole member 2b. After such movement has taken place, the excitation direction of the armature 10 will be reversed and the armature 10 will repulse the north pole member 2b and thereby be drawn toward the adjacent or next south pole member 2a as the moving member 7 moves thereto. Circuits which may be utilized for energizing the armature as described above can be more fully understood by reference to FIG. 10.

Figure 10:
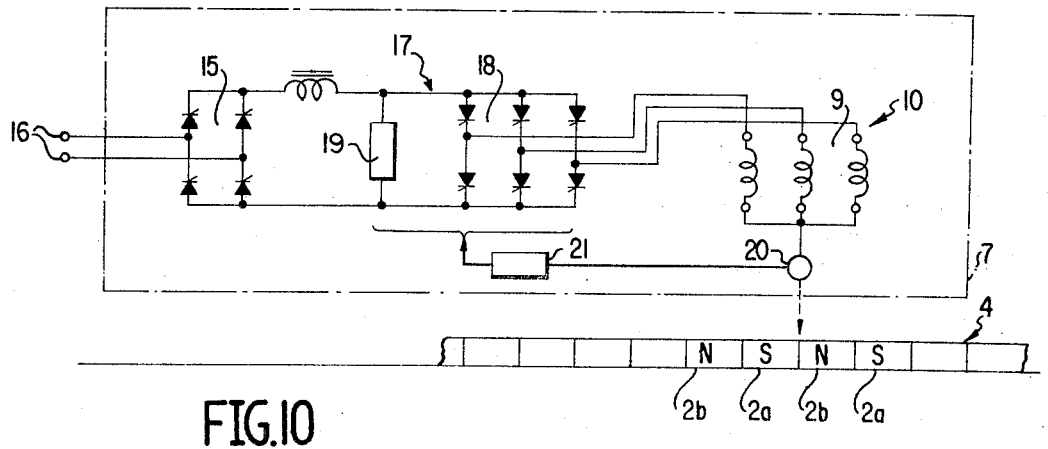

In FIG. 10, the moving member 7 is generally shown as a block of dot and dashed lines, and includes a single phase type A.C. full wave rectifier 15 and a pair of A.C. input terminals 16, which are connected between an A.C. power supply (not shown) by means of the combination of a catenary wire or a third rail and a grounded track (not shown). The full wave bridge rectifier 15 may be composed of four thyristors and the same supplies D.C. variable voltages to a forced commutation type three-phase thyristor inverter 17. The three-phase thyristor inverter 17 may include six thyristors connected in a three-phase full wave bridge circuit 18 and a forced commutation circuit 19. As is well known in the art, a forced commutation circuit 19 has a capacitor unit (not shown) which is normally charged by the D.C. outputs of the rectifier 15 or another rectifier and the capacitor unit is used for supplying a charging voltage having a relatively constant D.C. voltage level. The force commutation circuit 19 also is known to include a switching thyristor unit in order to supply the necessary forced commutation currents from the capacitor unit to the thyristors in the bridge circuit 18 in order to turn off the thyristors when in a conductive state.

The outputs of the inverter 17 are connected to the inputs of the armature winding 9 of the linear synchronous motor, and the input power of the linear motor can easily be varied in accordance with the control of the gates of the bridge rectifier 15 such that the running speed of the moving member 7 can be smoothly varied.

To energize the armature winding 9 with a predetermined and exact sequence, an angular detector 20 is provided, such as of the type which includes a pickup coil located near the pole surfaces of the reaction rail and the same is mounted on the body of the moving member 7. Near the position of the pickup coil either a positive or a negative pulse will appear every time the coil passes through the boundary between successive poles 2b and 2a. These pulses are then supplied to a gate control 21 for controlling the gates of the thyristors of the inverter 17 and the forced commutation circuit 19 at a predetermined sequence. The moving member 7 can thereby continue to move in a satisfactory manner.

Where it is preferred to make a regenerative or speed suppressing brake for the moving member 7, this can easily be accomplished by changing the operation of the rectifier 15 into an inverter and the inverter 18 into a rectifier.

Figure 9:
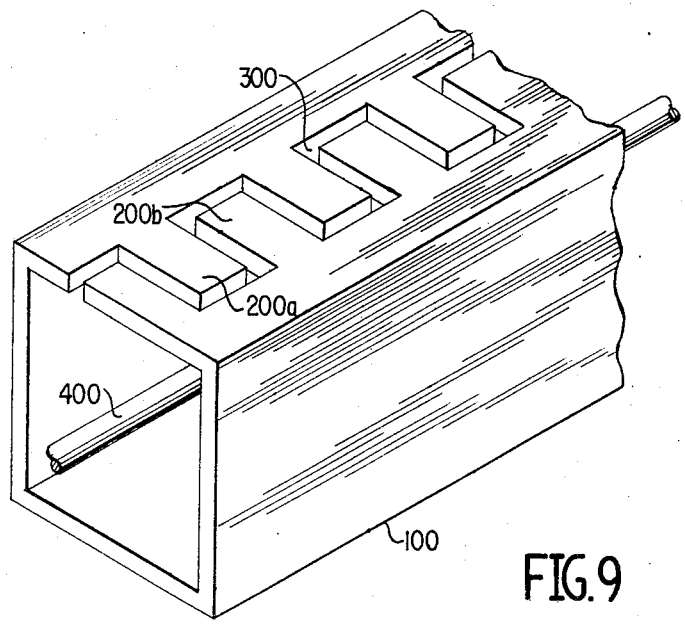
FIG. 9 is a perspective view of yet another alternative embodiment of a reaction rail according to the present invention; and, FIG. 10 is a diagram of a circuit utilized to energize the armature of the linear synchronous motor of the present invention.

The reaction rail 1 in FIG. 1 has been shown by way of example as being of cylindrical shape. In FIG. 9 it is seen that the invention is not so limited and a reaction rail 100 is shown having a rectangular cross section. In FIG. 9 the various parts similar to those of FIGS. 1 through 3 are designated with the numerals 00 added.

Figure 4:
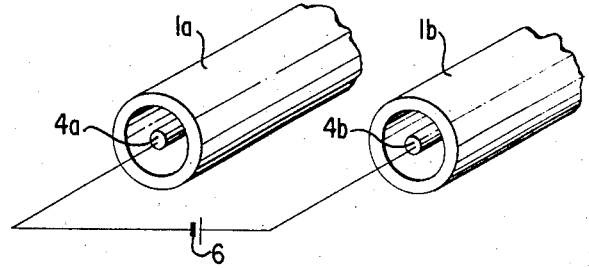
FIG. 4 is a perspective view of the reaction rails of another and alternative embodiment of the present invention.
Figure 5:
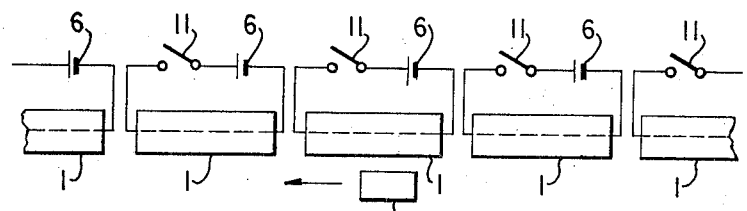
FIG. 5 is a plane view of a reaction rail of one other alternative embodiment of the present invention.

Referring now to FIGS. 4 and 5 alternative embodiments are shown illustrating the excitation means of the present invention. In order to simplify the illustrations, the zigzag slit and comb-shaped pole members are not shown. In FIG. 4, two excitation conductors 4a and 4b are shown as extending through the respective reaction rails 1a and 1b and are connected to a D.C. supply 6 to form a loop circuit. With such an arrangement, it should be apparent that the conductor 5 in FIG. 1 can be eliminated.

In FIG. 5 the reaction rail 1 is divided into a plurality of separate rail sections and each section has an excitation conductor which extends therethrough. Each excitation conductor is connected to a separate switch 11. When the moving member 7 is driving, the reaction rail section which is opposite to the moving member 7 will be the only section magnetized. The remaining sections will not be excited until the moving member 7 passes thereacross. With this arrangement the consumption of excitation power is reduced.

Moreover, according to this invention, since the reaction rail 1 has a tubular cross section and the excitation conductor 4 extends through the reaction rail 1, the arrangement, as described hereinafter, is easily obtained.

Usually excitation conductors are made of either copper or aluminum wire. It is well known that if a sodium wire could be used as the excitation conductor that much less electric power is consumed relative to that of the copper or aluminum wire. However, it is also known that sodium wire is very weak against mechanical forces and also undergoes chemical reaction with water. Thus, in the usual device it is difficult to use a sodium wire as a conductor. According to this invention, since the reaction rail 1 has a tubular cross section, a sodium wire is easily and safely accommodated therein.

In addition, it is well known that a super conductive wire consumes very little electric power. A super conductive wire is generally provided in a super low temperature cryostat formed by fluid helium in a container which is insulated from heat by a vacuum layer or the like. According to this invention, the super low temperature cryostat can easily be accommodated in the tubular cross section reaction rail 1. Thus, by using a sodium wire or a super conductive wire as the excitation conductor 4 it is apparent that excitation losses can be effectively reduced.

Figure 6:
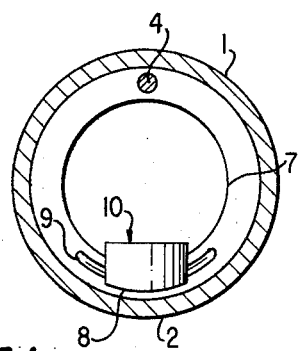
FIG. 6 is a cross section view of a still further alternative embodiment of the present invention.

Referring now to FIG. 6 another alternative embodiment according to this invention is shown which enables the air resistance of the moving member 7 to be greatly decreased. In FIG. 6, both the moving member 7 and the excitation conductor 4 are provided within the reaction rail 1, and the pressure within the reaction rail 1 is made low, such as near a vacuum state. Since the moving member 7 will move in a substantially evacuated space within the reaction rail 1, the air resistance is extremely low. Under such conditions, the moving member 7 will move smoothly and the electric power used to drive the moving member 7 can be reduced.

Figure 7:
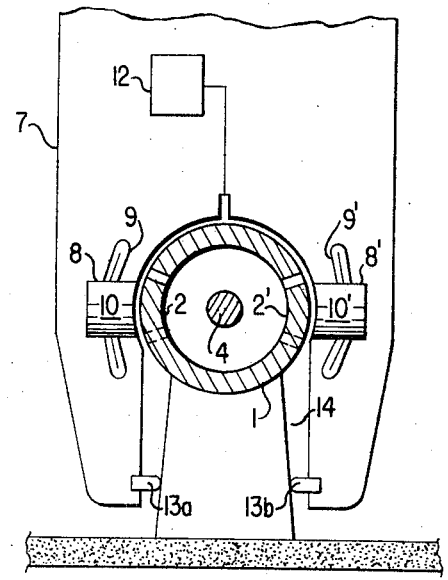
FIG. 7 is a cross section view of still another alterative embodiment of the present invention.
Figure 8:
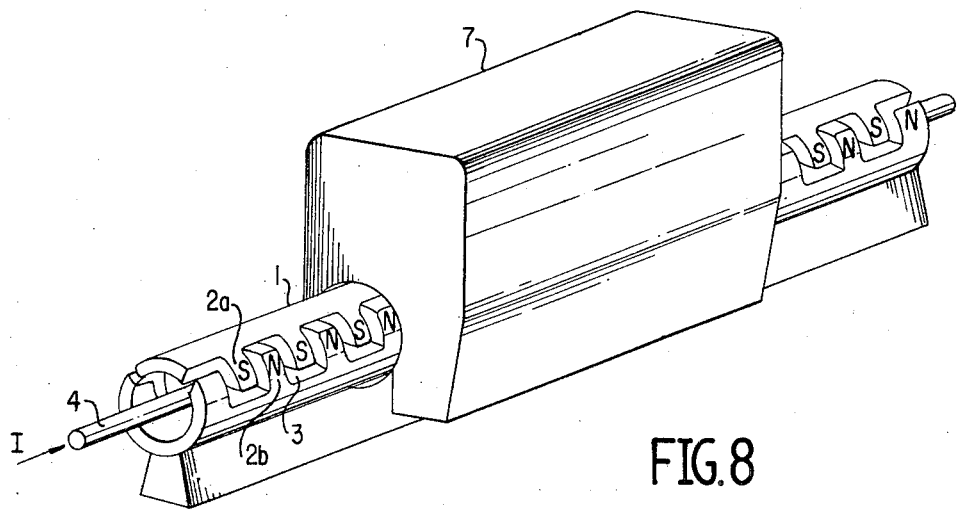
FIG. 8 is a perspective view of the alternative embodiment shown in FIG. 7.

Referring now to FIGS. 7 and 8 another alternative embodiment of this invention is therein shown. In accordance with this embodiment, the reaction rail 1 can be used as a saddle for the moving member 7. The reaction rail 1 is provided with two trains of magnetic poles 2 and 2' and therefore two armatures 10 and 10' are mounted on the moving member 7. An air compressor 12 is provided and is mounted on the moving member 7. The air compressor 12 generates a highly pressurized air which is expelled into a gap 14 between the reaction rail 1 and the moving member 7. The gap 14 is held in place by members 13a and 13b equipped on a skirt of the moving member 7. The highly pressurized air flows through the gap 14 and will float the moving member 7 from the reaction rail 1 without friction therebetween. In this manner, since the reaction rail can be used as a saddle for the moving member 7, the construction is very easy and inexpensive.

It should now be apparent that in accordance with the present invention, a linear synchronous motor of easy construction and inexpensive in cost is provided by the provision of a reaction rail having a tubular cross section, and an excitation conductor which extends therethrough.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A linear comb-shaped synchronous motor comprising:
    an elongated reaction rail having a tubular cross-section and made of a magnetic material, said rail being provided with one zigzag slit along the longitudinal direction thereof;
    first comb-shaped electromagnetic pole members provided at one edge portion of said rail adjacent to said zigzag slit of the rail;
    second comb-shaped electromagnetic pole members provided at the other edge portion of said rail adjacent to said zigzag slit of the rail, each of said second comb-shaped electromagnetic pole members being respectively disposed between adjacent electromagnetic pole members of said first comb-shaped electromagnetic pole members without directly contacting said first comb-shaped electromagnetic pole members;
    one excitation conductor extending through said tubular type reaction rail for receiving a D.C. excitation current such that one group of said first or second comb-shaped electromagnetic pole members is magnetized so as to make a train of north poles and the other group is magnetized so as to make a train of south poles, and,
    an armature structure having a polyphase winding wound thereon for receiving an A.C. excitation, said armature structure being mounted on a moving member so as to be successively faced to the functional surface of said first and second comb-shaped electromagnetic pole members through an air gap as the moving member moves along the reaction rail.

2. A linear comb-shaped synchronous motor according to claim 1, wherein:
    said reaction rail has a circular cross section, and said armature has a curved functional surface.

3. A linear comb-shaped synchronous motor according to claim 1, wherein:
    said reaction rail has a rectangular cross section and comb-shaped pole members located along at least one plane thereof.

4. A linear comb-shaped synchronous motor according to claim 1, wherein:
    said reaction rail is divided into a plurality of sections in the lengthwise direction thereof, each of said sections including respective excitation means and wherein separate switching means are combined with each of said excitation means such that the excitation means are separately operated in response to the existence of said moving member.

5. A linear comb-shaped synchronous motor according to claim 1, wherein:
    a pair of reaction rails are located in parallel, and wherein excitation conductors respectively extend through said rails and are connected to each other to form a current loop which includes a D.C. supply therein.

6. A linear comb-shaped synchronous motor according to claim 1, wherein:
said moving member is located within said reaction rail.

7. A linear comb-shaped synchronous motor according to claim 1, wherein:
said reaction rail is shaped to form a saddle for said moving member.

8. A linear comb-shaped synchronous motor according to claim 1, wherein:
said at least one excitation conductor is a sodium wire.

9. A linear comb-shaped synchronous motor according to claim 1, wherein:
said at least one excitation conductor is a super conductive wire.

* * * * *